United States Patent [19]

Zahid

[11] 4,265,274

[45] May 5, 1981

[54] PULSATION DAMPENER FOR LOW OUTPUT SYSTEMS

[75] Inventor: Abduz Zahid, Los Angeles, Calif.

[73] Assignee: Greer Hydraulics, Incorporated, Chatsworth, Calif.

[21] Appl. No.: 72,439

[22] Filed: Sep. 4, 1979

[51] Int. Cl.[3] .............................................. F16L 55/04

[52] U.S. Cl. .......................................... 138/30; 138/26

[58] Field of Search .................. 138/26, 30; 220/85 B; 60/413

[56] References Cited

U.S. PATENT DOCUMENTS

| | | | |
|---|---|---|---|
| 381,731 | 4/1888 | Walker | 138/30 |
| 2,079,829 | 5/1937 | Zoeller | 138/30 |
| 2,697,451 | 12/1954 | Knauth | 138/30 |
| 3,028,881 | 4/1962 | Koomey et al. | 138/30 |
| 3,878,867 | 4/1975 | Dirks | 138/30 |
| 3,948,288 | 4/1976 | Mayer | 138/30 |
| 3,983,902 | 10/1976 | Lord | 138/30 |
| 4,166,655 | 9/1979 | Spero | 138/30 |

*Primary Examiner*—James E. Bryant, III

*Attorney, Agent, or Firm*—Arthur B. Colvin

[57] ABSTRACT

A pulsation dampener particularly adapted for use in damping pulses created by chemical injection pumps is disclosed, the dampener being characterized by a shell or pressure vessel construction formed of two parts, namely an upper part encompassing substantially three quarters or more of the total enclosed volume and a lower part encompassing one quarter or less of the total enclosed volume.

4 Claims, 2 Drawing Figures

PULSATION DAMPENER FOR LOW OUTPUT SYSTEMS

BACKGROUND OF THE INVENTION

1. Field of the Invention

The present invention is in the field of pulsation dampener devices, and particularly pulsation dampener devices adapted to be used in conjunction with chemical injection pumps or the like to dampen pulses in hydraulic systems handling highly corrosive liquids.

2. The Prior Art

The use of pulsation dampeners to dampen pulses in hydraulic systems is today commonplace. Such pulsation dampener devices typically comprise a pressure vessel divided into two chambers, notably a gas chamber and a chamber in communication with the liquid under pressure, the chambers being separated by a flexible resilient separator, illustratively a diaphragm. Upon the occurrence of pressures in the liquid system in excess of pressure in the gas charged chamber, fluid enters through the liquid port, unseating the diaphragm or a valve member mounted upon the diaphragm, from the liquid port, causing the compression of gas and the storage of energy therein. When the liquid pressure falls below the gas pressure, the expanding gas shifts the diaphragm toward the liquid port, returning the stored energy to the liquid.

By the use of such systems, pulses generated by cyclically operated pumps or the like are dampened and the fluids downstream of the dampener device operate with pulses of a limited magnitude.

Pulsation dampeners are frequently used in chemical systems, i.e. in connection with chemical injection pumps which may include highly corrosive liquids. In such environments, it is obvious that the pressure vessel, or at least those portions of the vessel which will contact the liquids and the diaphragm, must be made of corrosion resistant materials, greatly adding to the expense of production.

SUMMARY

The present invention may be summarized as directed to an improved, low cost pulsation dampener device especially adapted for low output hydraulic systems, such as systems powered by chemical injection pumps.

The device of the invention is characterized by the provision of a two part pressure vessel, the upper part or gas chamber of which encompasses substantially three quarters or more of the volume of the system, and the lower part of which encompasses one quarter or less of such volume.

A resilient bladder or diaphragm may be clampingly disposed between the parts of the pressure vessel, dividing the same into chambers separated by the diaphragm.

Since the lower chamber will be the only chamber which will contact the corrosive fluids, it may be made of a corrosion resistant material, and the upper shell part may be fabricated without regard to its corrosion resistant properties, thereby greatly reducing the expense of the dampener device.

Additionally, the bladder or diaphragm, which typically in chemical applications must be made of a highly resistant material with substantial resultant expense, may, by virtue of the low output or amplitude of the pulses, be maintained of a relatively small size, with consequent economy.

In view of the low amplitude of the pulses to be encountered and the consequent fact that the diaphragm or bladder is not likely to enter a substantial distance into the upper shell part, it is possible to locate the gas charging port at a medial position along the side walls of the upper part rather than at the uppermost end of the said part.

Accordingly, it is an object of the invention to provide a low output pulsation dampener which may be fabricated on an economical basis.

A further object of the invention is the provision of a pulsation dampener of the type described wherein the pressure vessel is comprised of upper and lower parts, comprising respectively, gas and liquid chambers, the volume of the upper part being substantially greater than the volume of the lower part, whereby the lower part, being the only part to be contacted with the liquid of the hydraulic system, may be manufactured of a material resistant to the chemical system, and the upper part may be fabricated of a less expensive material since it will be isolated from the chemicals.

To attain these objects and such further objects as may appear herein or be hereinafter pointed out, reference is made to the accompanying drawings, forming a part hereof, in which.

Figure 1:
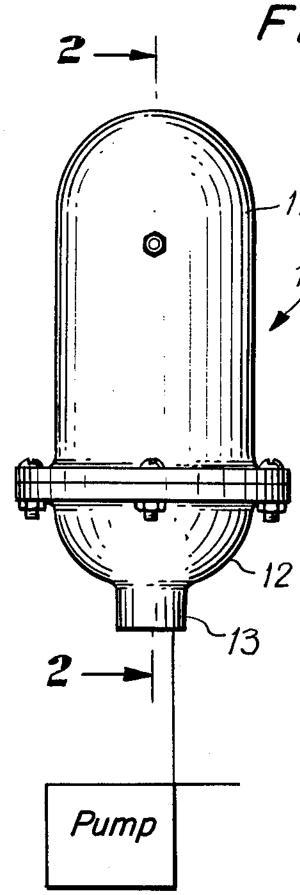
FIG. 1 is a side elevational view of a pulsation dampener device of the type described.
Figure 2:
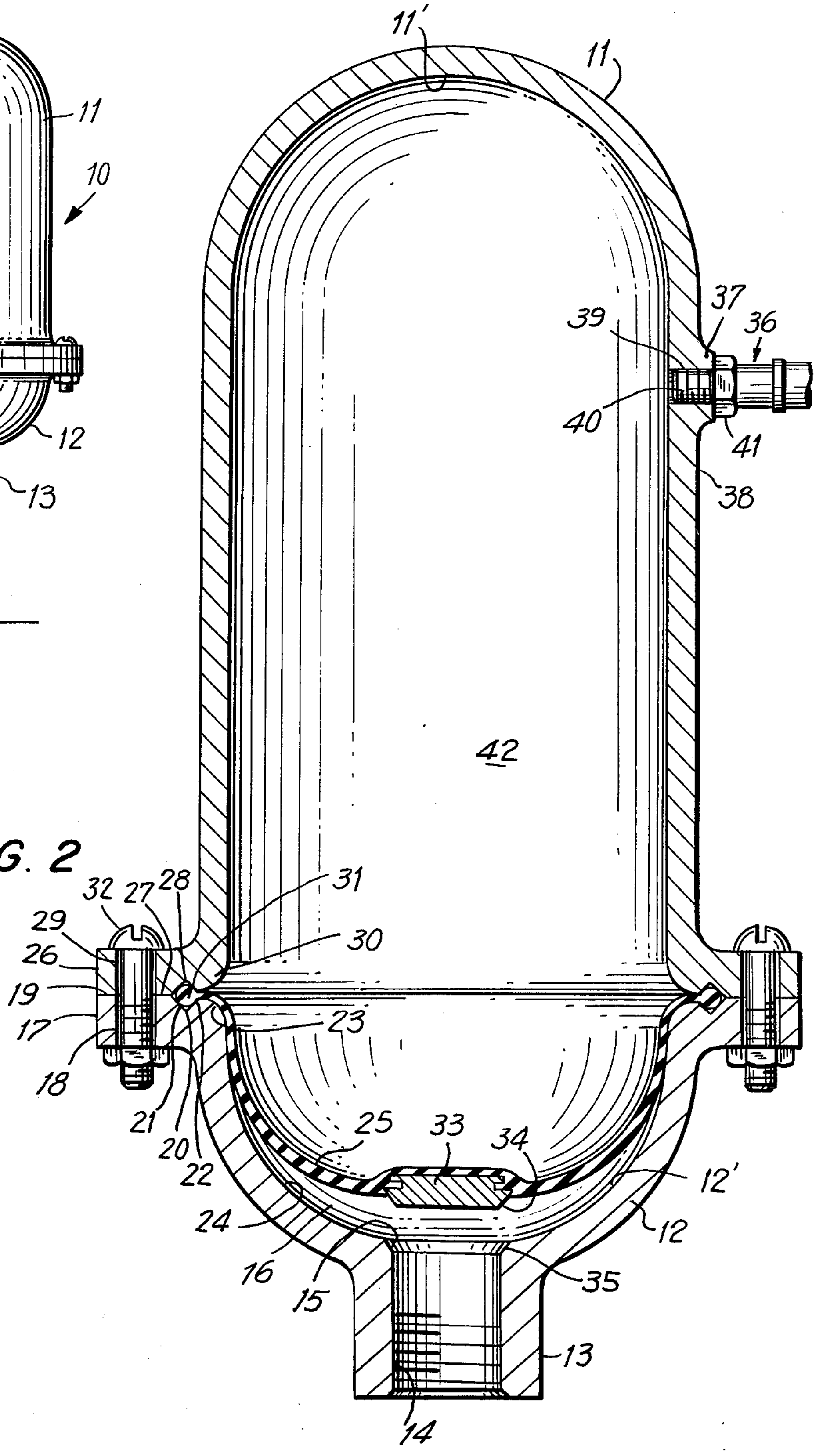
FIG. 2 is a magnified vertical section taken on the line 2—2 of FIG. 1.

Referring now to the drawings, there is shown in FIG. 1 a pulsation dampener device 10 including an upper shell part 11 and a lower shell part 12. The lower shell part includes a neck portion 13, internally threaded as at 14, for connection to a conduit of a hydraulic system such as powered by a chemical injection pump.

A liquid port 15 is formed at the upper end of the neck 13 leading to a lower liquid chamber 16. The lower shell 12 includes at its uppermost edge a radially directed flange 17 having a plurality of through-going attachment apertures 18 formed at circumferentially spaced positions thereabout.

The uppermost face 19 of the flange 17 is flat and includes an upwardly facing annular groove 20, the walls of which groove are defined by downwardly converging straight sides 21, 22.

A transition area 23 is formed on the internal wall 24 of the shell part 12 adjacent the groove, the transition area 23 providing a progressive curve so as to avoid an edge which may indent or cut the diaphragm assembly 25.

The upper shell portion 11, the enclosed volume of which is approximately three or more times the volume of the lower shell portion, includes an annular flange 26 at its lowermost end, the flange having a flat under surface 27 which mates with the upwardly directed surface 19 of the flange 17. The flange 26 includes a downwardly facing annular groove 28 shaped in accordance with the lower groove 20 and registers with said lower groove. The flange 26 also includes a series of through-going bores 29 spaced to register with the bores 18 of the lower flange 17.

The upper shell 11, adjacent the groove 28, includes a transition portion 30 having a gradually curved configuration.

The diaphragm assembly 25 includes a thickened peripheral bead 31 adapted to be received in the mating grooves 20–28 in the assembled position of the shell parts. The dimensions of the grooves are such as tightly to compress the bead in the registering grooves and define a seal when the shell parts are clamped together by bolt assemblies 32 passing through registering apertures 18 and 29.

The spacing of the transition portions 23, 30 is such as to provide clearance for the thickness of the bladder assembly 25, which assembly is fabricated of a resilient distensible material selected to be compatible with the chemical system employed.

Whereas normal bladder assemblies of pulsation dampener devices may be comprised of neoprene, it may be necessary, depending upon the chemical systems involved, to fabric the instant dampeners of special elastomeric compounds such as are sold under the proprietary trademarks VITON, HYPLON, NORDEL or the like.

In view of the fact that the displacement of the pump with which the device is to be used is small, the system enables a relatively small diaphragm assembly to be employed thus affording substantial cost savings in view of the high cost of the diaphragm.

The diaphragm preferably includes a button 33 at a lower medial portion, which button may be formed of TEFLON or like durable material, said button functioning in the usual manner as a valve. The button 33, which may be bonded or or molded in situ into the bladder assembly, may include tapered side portions 34 inclined to match the bevel of the valve seat portion 35 surrounding the liquid port 15.

A gas charging valve assembly 36 is provided in the upper shell part 11, as shown. The valve assembly need not be disposed in the typical position, namely on the longitudinal axis of the shell but, rather, may be located in a thickened boss 37 in a side wall portion 38 of the upper part.

Through-going aperture 39 is formed in the boss 37, the aperture being internally threaded to match the external thread 40 of the valve assembly. Preferably, a lock nut 41 may be tightened against the exterior of the boss to prevent inadvertent rotation of the valve assembly.

The shell portions 11, 12 may include hemispherical extremities 11' and 12'.

The upper shell part 11 is charged through valve assembly 36 with gas under pressure, thereby distending the diaphragm in such manner that the button 33 seats against the valve seat 35 sealing the liquid port. When the pressures in the liquid system exceed the gas pressure in the chamber 42 above the diaphragm, the valve member will be unseated, liquids will enter into the chamber 16, compressing the gas in the upper chamber 42.

When the pressure in the liquid system falls, to a level below that in chamber 42, the potential energy stored in the gas will cause the diaphragm to expand, reseating the button or valve member 33 and transferring the stored potential energy to the liquid, with damping of pulsations resulting from the progressive absorption and return of energy from and to the liquid.

By virtue of the large gas volume and consequent high elasticity ratio as compared with the pulse amplitude of the liquid system, the energy absorption is efficiently carried out.

In this connection it should be recognized that the device in accordance with the invention is particularly adapted for low output, e.g. 0.1 to 1 gallon per minute chemical injunction and feed pumps. Since these pumps displace a very small volume of liquid during each revolution, only a small movement of the diaphragm will be encountered during each cycle.

Preferably, the pre-charge pressure injected into the gas chamber 42 is 70–80% of the mean line pressure in the liquid system, thereby making the unit suitable for use as a dampener but not as an energy storage device.

As a result of the construction wherein the upper shell part encompasses an included volume of three or more times the volume of the lower shell part, it will be recognized that the cost of fabrication is substantially reduced since it is only the lower part which is contacted by the liquid chemical systems, and thus only such lower part need be fabricated of corrosion resistant metal.

Additionally, since the amplitude of the encountered pulses are small, eliminating the possibility that the diaphragm will be distended far inside the upper shell part, it is feasible to include the gas charging valve at an intermediate position along the walls of the upper shell part.

It will be evident to those skilled in the art familiarized with the instant invention that variations may be made in the described embodiment without departing from the spirit of the invention. Accordingly, the invention is to be broadly construed within the scope of the appended claims.

Having thus described the invention and illustrated its use, what is claimed as new and is desired to be secured by Letters Patent is:

1. A low output pulsation dampener device comprising, in combination, an upper generally cylindrical shell part and a lower generally cylindrical shell part, each of said parts including at one end a generally hemispherical end and at the other end a radially directed flange, said flanges being disposed in juxtaposition, and including opposed annular registering groove portions, a separator assembly interposed between said shell parts, said separator assembly comprising a resilient elastomeric member having an enlarged annular bead sealingly clamped between said registering annular grooves, clamp means interposed between said flanges maintaining said bead in compressed relation within said grooves, a liquid port formed in said lower shell part, a valve member carried by said bladder and shiftable toward and away from said liquid port responsive to pressure variations in said liquid port, a gas charging valve formed in said upper shell part, gas under pressure disposed within said upper shell part for maintaining said valve member in a normally seated position on said valve seat, said device being characterized by the volume of said upper shell part comprising substantially three or more times the volume of said lower part and by the lower shell part comprising a corrosion resisting metallic material and said upper shell part comprising a different and less expensive metallic material.

2. Apparatus in accordance with claim 1 wherein said gas charging valve is located intermediate the length of said upper shell portion.

3. A hydraulic system including a pulsation dampener device in accordance with claim 1 and further including pump means connected to said lower shell part and having a displacement, the value of said displacement being relatively small with respect to the total enclosed volume of said pressure vessel.

4. A hydraulic system in accordance with claim 3 wherein the precharge gas pressure within said upper shell part constitutes about 70–80% of the expected pressure generated by said pump means.

* * * * *